US012062321B2

(12) United States Patent
Yang et al.

(10) Patent No.: US 12,062,321 B2
(45) Date of Patent: Aug. 13, 2024

(54) LIGHT EMITTING DIODE DISPLAY DEVICE

(71) Applicant: MACROBLOCK, INC., Hsinchu (TW)

(72) Inventors: Li-Chang Yang, Hsinchu (TW); Yi-Sheng Lin, Hsinchu (TW)

(73) Assignee: MACROBLOCK, INC., Hsinchu (TW)

( * ) Notice: Subject to any disclaimer, the term of this patent is extended or adjusted under 35 U.S.C. 154(b) by 0 days.

(21) Appl. No.: 18/338,817

(22) Filed: Jun. 21, 2023

(65) Prior Publication Data

US 2024/0071287 A1 Feb. 29, 2024

(30) Foreign Application Priority Data

Aug. 25, 2022 (TW) .................................. 111132111

(51) Int. Cl.
*G09G 3/20* (2006.01)
*G09G 3/32* (2016.01)

(52) U.S. Cl.
CPC ............. *G09G 3/2096* (2013.01); *G09G 3/32* (2013.01); *G09G 2300/0426* (2013.01); *G09G 2330/021* (2013.01)

(58) Field of Classification Search
None
See application file for complete search history.

(56) References Cited

U.S. PATENT DOCUMENTS 11,373,584 B2 * 6/2022 Zhao ........................ G09G 3/32
11,688,336 B2 * 6/2023 Zhao ................... H01L 27/1248 345/206
11,715,413 B2 * 8/2023 Oh ....................... G09F 9/3026 345/55

(Continued)

FOREIGN PATENT DOCUMENTS

TW 521237 B 2/2003
TW 200813954 A 3/2008

(Continued)

OTHER PUBLICATIONS

Search Report appended to an Office Action, which was issued to Taiwanese counterpart application No. 111132111 by the TIPO on Oct. 12, 2023, with an English translation thereof.

*Primary Examiner* — Andre L Matthews
(74) *Attorney, Agent, or Firm* — Akerman LLP; Peter A. Chiabotti

(57) ABSTRACT

An LED display device includes a system board, and multiple daughterboards that are assembled on the system board. The system board includes a drive power circuit, a first gate circuit and a second gate circuit. Each daughterboard includes a substrate, multiple LEDs that are disposed on the substrate, multiple first transistor switches that are respectively connected to the LEDs, and at least one second transistor switch that is connected to the LEDs. With respect to each daughterboard, the first transistor switches and the at least one second transistor switch cooperatively control current flows through the LEDs; the first transistor switches are further connected to the drive power circuit to respectively receive multiple drive currents, and are further connected to the first gate circuit to receive a timing signal; and the at least one second transistor switch is further connected to the second gate circuit to receive a timing signal.

11 Claims, 3 Drawing Sheets

(56) References Cited

U.S. PATENT DOCUMENTS

| | | | | |
|---|---|---|---|---|
| 2002/0044140 | A1 | 4/2002 | Inukai | |
| 2008/0030439 | A1 | 2/2008 | Shin | |
| 2012/0062528 | A1 | 3/2012 | Kimura et al. | |
| 2017/0352313 | A1* | 12/2017 | Miyake | G09G 3/3258 |
| 2018/0180942 | A1* | 6/2018 | Peterson | G02F 1/133603 |
| 2020/0075639 | A1* | 3/2020 | Li | H01L 27/1244 |
| 2020/0243017 | A1* | 7/2020 | Lee | G09G 3/3233 |
| 2022/0375420 | A1* | 11/2022 | Qin | G09G 3/3607 |
| 2023/0080385 | A1* | 3/2023 | Yuan | G09G 3/3648 345/87 |
| 2023/0196979 | A1* | 6/2023 | Cok | G09G 3/32 345/55 |
| 2024/0071294 | A1* | 2/2024 | Yang | G09G 3/32 |
| 2024/0071298 | A1* | 2/2024 | Huang | H01L 25/162 |

FOREIGN PATENT DOCUMENTS

| | | | |
|---|---|---|---|
| TW | 200941440 | A | 10/2009 |
| TW | 201537570 | A | 10/2015 |

* cited by examiner

LIGHT EMITTING DIODE DISPLAY DEVICE

CROSS-REFERENCE TO RELATED APPLICATION

This application claims priority to Taiwanese Patent Application No. 111132111, filed on Aug. 25, 2022.

FIELD

The disclosure relates to a display device, and more particularly to an assembled light emitting diode display device.

BACKGROUND

As compared to conventional light emitting elements, light emitting diodes (LEDs) have become the mainstream light source in recent years because of their advantages such as small size, high brightness, low heat generation, power efficiency, etc. However, when LEDs are to be applied as a display light source and are to be mass transferred during assembly, because of the miniaturization of the LEDs and the huge amount of LEDs required, mass transfer of the LEDs is not only a time consuming process, but may also encounter tolerance problems in the misalignment of the LEDs. Therefore, the mass transfer of LEDs is a significant bottleneck holding back the commercial application of LEDs. In addition, during the mass transfer of LEDs, a circuit board for carrying the LEDs is prone to deformation or warping because of uneven stress endured by the circuit board.

SUMMARY

Therefore, an object of the disclosure is to provide a light emitting diode (LED) display device that can alleviate at least one of the drawbacks of the prior art.

According to the disclosure, the LED display device includes a system board and a plurality of daughterboards. The system board includes a drive power circuit, a first gate circuit and a second gate circuit. The daughterboards are assembled on the system board. Each of the daughterboards includes a substrate, a plurality of LEDs that are disposed on the substrate, a plurality of first transistor switches that are respectively connected to the LEDs, and at least one second transistor switch that is connected to the LEDs. With respect to each of the daughterboards, the first transistor switches and the at least one second transistor switch cooperatively control current flows through the LEDs; the first transistor switches are further connected to the drive power circuit to respectively receive a plurality of drive currents, and are further connected to the first gate circuit to receive a timing signal; and the at least one second transistor switch is further connected to the second gate circuit to receive a timing signal.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
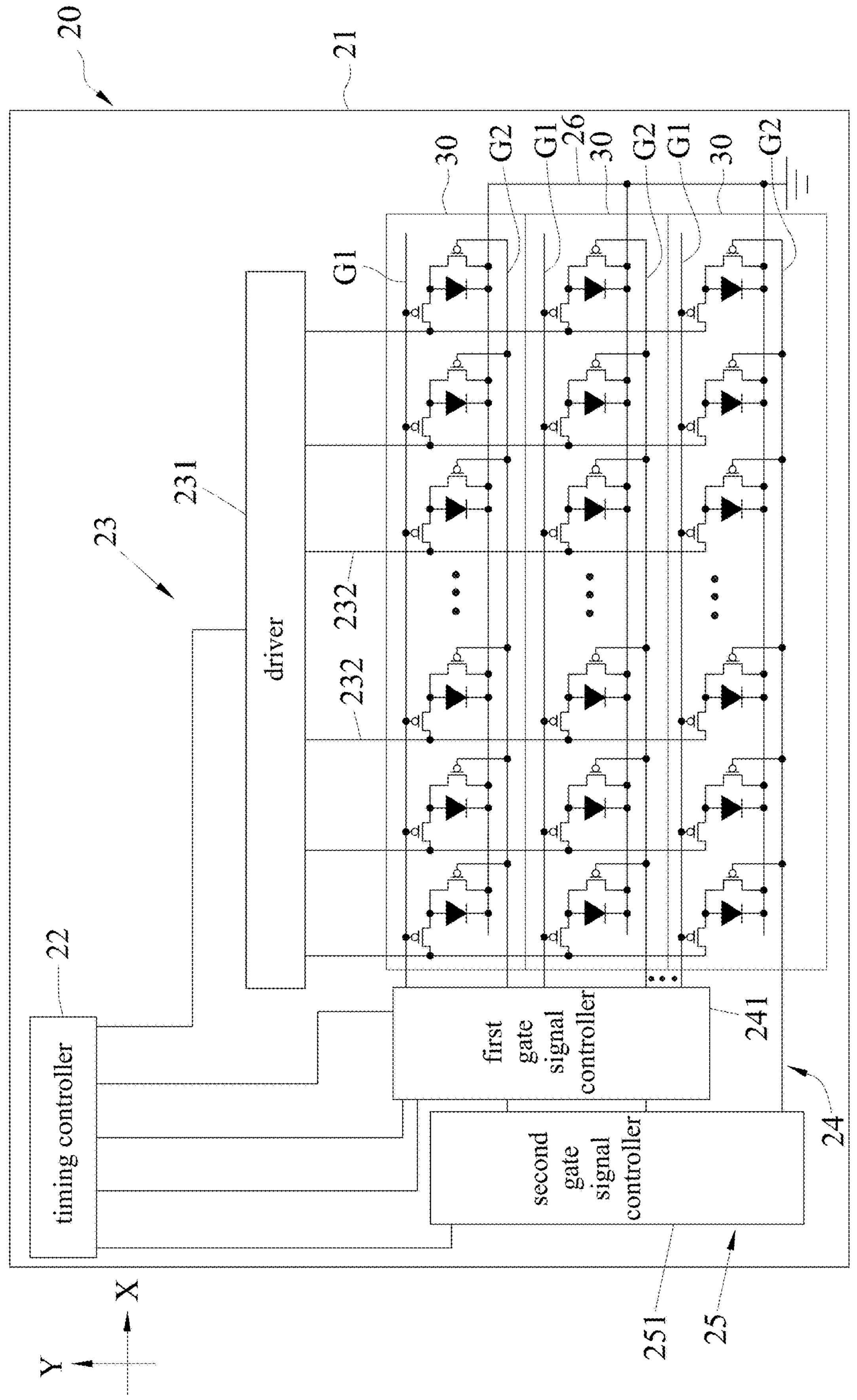
FIG. 1 is a schematic view illustrating a first embodiment of a light emitting diode (LED) display device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
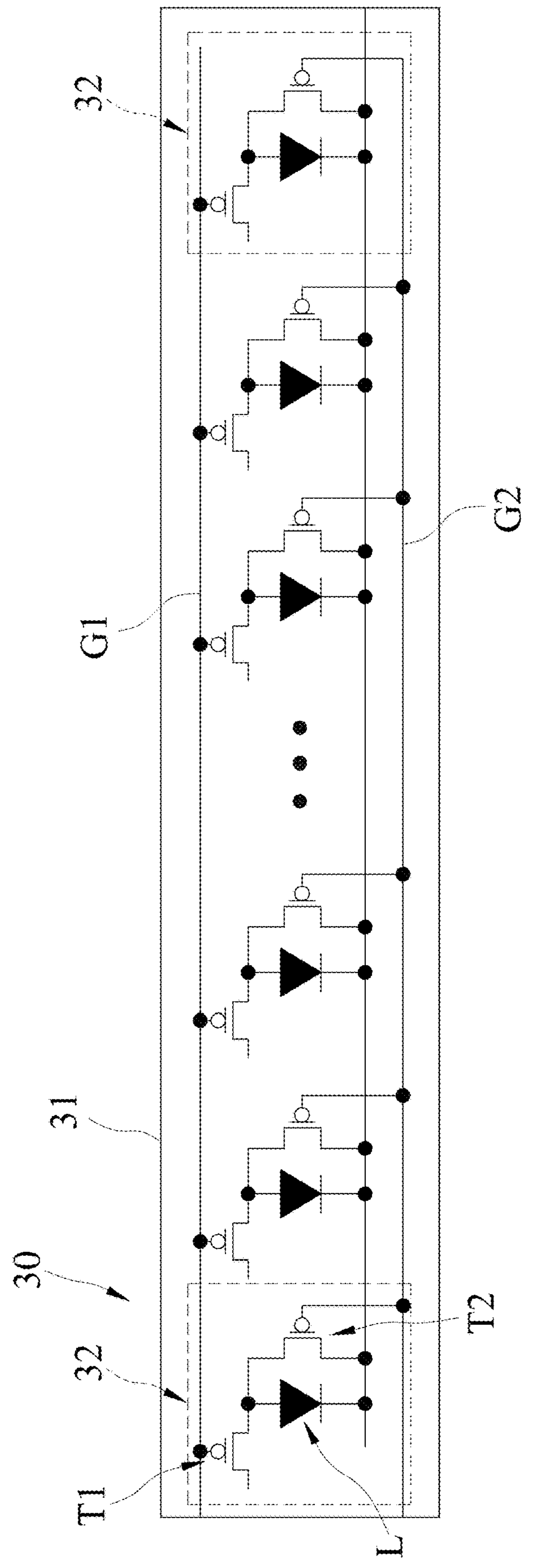
FIG. 2 is a schematic view illustrating a daughterboard of the first embodiment.

Referring to FIGS. 1 and 2, a first embodiment of a light emitting diode (LED) display device according to the disclosure includes a system board 20 and a plurality of daughterboards 30.

The system board 20 includes a board body 21, a timing controller 22, a drive power circuit 23, a first gate circuit 24, a second gate circuit 25 and a ground circuit 26. The timing controller 22, the drive power circuit 23, the first gate circuit 24, the second gate circuit 25 and the ground circuit 26 are disposed on the board body 21.

The board body 21 is selected from a glass substrate, a silicon substrate and a circuit board, and is formed with a circuit structure including multiple connection wires. For illustration purposes, in this embodiment, the board body 21 is a circuit board. The timing controller 22 is connected to the circuit structure, and is configured to provide timing signals. The drive power circuit 23, the first gate circuit 24 and the second gate circuit 25 are connected to the timing controller 22 through the circuit structure so as to receive the timing signals.

The drive power circuit 23 includes a driver 231 that is connected to the timing controller 22 through the circuit structure, and a plurality of power lines 232 that are connected to the driver 231. The driver 231 is configured to receive timing signals from the timing controller 22, and to provide and control a plurality of drive currents respectively to the power lines 232 based on the timing signals. The first gate circuit 24 includes a first gate signal controller 241 that is connected to the timing controller 22 through the circuit structure, and a plurality of first gate lines (G1) that are connected to the first gate signal controller 241. The second gate circuit 25 includes a second gate signal controller 251 that is connected to the timing controller 22 through the circuit structure, and a plurality of second gate lines (G2) that are connected to the second gate signal controller 251.

The power lines 232 are spaced apart from each other, and extend along a first direction (Y). The first gate lines (G1) and the second gate lines (G2) extend along a second direction (X) traverse to the first direction (Y), and are spaced apart from each other. The first gate lines (G1) are arranged alternatingly with the second gate lines (G2). The power lines 232, the first gate lines (G1) and the second gate lines (G2) cooperatively define multiple placement areas. For illustration purposes, the first direction is the (Y) direction and the second direction is the (X) direction in this embodiment, but the disclosure is not limited to such configuration.

The daughterboards 30 are to be assembled on the system board 20. Each of the daughterboards 30 includes a substrate 31, and a plurality of LED units 32 that are disposed on the substrate 31. When the daughterboards 30 are assembled on the system board 20, the LED units 32 of the daughterboards 30 respectively correspond to the placement areas in position.

With respect to each of the daughterboards 30, the substrate 31 is selected from a glass substrate, a silicon substrate, a circuit board, etc. Each of the LED units 32 includes an LED (L), a first transistor switch (T1) and a second transistor switch (T2). The first transistor switch (T1) and the second transistor switch (T2) are connected to the LED (L), and cooperatively control current flow through the LED (L).

With respect to each of the daughterboards 30, each of the first transistor switches (T1) and the second transistor switches (T2) of the LED units 32 is a field effect transistor (FET). For example, each of the first transistor switches (T1) and the second transistor switches (T2) is in the form of a thin film transistor (TFT), and is fabricated on the substrate 31 by a semiconductor fabrication process. A type of each of the first transistor switches (T1) and the second transistor switches (T2) is dependent on a material of the substrate 31. For example, when the substrate 31 is a glass substrate and a material deposited on a surface of the substrate 31 is amorphous silicon, each of the first transistor switches (T1) and the second transistor switches (T2) can only be an N-type TFT; when the substrate 31 is a glass substrate and the material deposited on the surface of the substrate 31 is low temperature polycrystalline silicon (LTPS), each of the first transistor switches (T1) and the second transistor switches (T2) can be any one of an N-type TFT and a P-type TFT; and when the substrate 31 is a silicon substrate, each of the first transistor switches (T1) and the second transistor switches (T2) can be any one of an N-type transistor and a P-type transistor.

The LEDs (L) to be disposed on the same substrate 31 may be unpackaged or packaged dies. The LEDs (L) to be disposed on the same substrate 31 may be placed on the substrate 31 by first forming the LEDs (L) on an original epitaxial substrate and then transferring the LEDs (L) to the substrate 31 one at a time or multiple at a time using a chip transfer method. Alternatively, the LEDs (L) to be disposed on the same substrate 31 may be placed on the substrate 31 by aligning and forming the LEDs (L) on at least one transparent substrate and then aligning and placing the LEDs (L) on the substrate 31 using a flip-chip method, so the LEDs (L) are sandwiched between the at least one transparent substrate and the substrate 31, and light emitted by the LEDs (L) will penetrate the at least one transparent substrate to be emitted outside. By transferring the LEDs (L) to the substrate 31 in batches or all at one time, the number of transfers can be reduced to achieve time efficiency, and tolerance problems such as misalignment of the LEDs (L) can be prevented. In addition, when multiple LEDs (L) are transferred to the same substrate 31 each time, the LEDs (L) can be connected to each other in a common cathode configuration or in a common anode configuration, and the driver 231 may drive the LEDs (L) in a way dependent on the connection configuration of the LEDs (L).

It should be noted that, with respect to each of the daughterboards 30, the LEDs (L) may emit light of different wavelengths by using different light-emitting materials. For example, the LEDs (L) may at least emit red light, blue light and green light. Alternatively, the LEDs (L) may be made of the same short-wavelength light-emitting material (blue or ultraviolet light-emitting material) to emit light of the same color, and different light-converting materials such as fluorescent powders, quantum dots, etc. are used to perform wavelength conversion so as to attain lights of different colors (e.g., red, blue, green, etc.). Material selection and detailed structure of the LEDs (L) are well known to those skilled in the art, and are omitted herein for the sake of brevity.

The LED display device of this embodiment may be assembled in the following way. At first, a plurality of LEDs (L) are formed on at least one substrate other than the substrates 31 and are transferred to the substrates 31, and then the LEDs (L) are connected to the first transistor switches (T1) and the second transistor switches (T2), so as to obtain the daughterboards 30. Thereafter, the daughterboards 30 are assembled on the board body 21, and are connected to the drive power circuit 23, the first gate circuit 24, the second gate circuit 25 and the ground circuit 26, so as to obtain the LED display device of this embodiment.

FIGS. 1 and 2 depict an implementation where each of the first transistor switches (T1) and the second transistor switches (T2) of the daughterboards 30 is a P-type transistor. When the daughterboards 30 are assembled on the board body 21, the LEDs (L) of the daughterboards 30 are arranged in a matrix that has a plurality of rows and a plurality of columns respectively corresponding to the power lines 232. The LEDs (L) of each of the daughterboards 30 are connected to each other in a common cathode configuration. With respect to each of the LED units 32 of the daughterboards 30, an anode of the LED (L) is connected to a drain terminal of the first transistor switch (T1) and a source terminal of the second transistor switch (T2). With respect to each of the columns, source terminals of the first transistor switches (T1) that respectively connected to the LEDs (L) in the column are connected to the power line 232 that corresponds to the column, so as to receive the drive current provided on the power line 232. The daughterboards 30 respectively correspond to the first gate lines (G1), and respectively correspond to the second gate lines (G2). With respect to each of the daughterboards 30, the LEDs (L) are arranged in the same row; gate terminals of the first transistor switches (T1) are connected to the first gate line (G1) that corresponds to the daughterboard 30 so as to receive a timing signal; gate terminals of the second transistor switches (T2) are connected to the second gate line (G2) that corresponds to the daughterboard 30 so as to receive a timing signal; and cathodes of the LEDs (L) and drain terminals of the second transistor switches (T2) are connected to the ground circuit 26.

In the implementation depicted in FIGS. 1 and 2, the LED display device performs time multiplexed scan and constant current drive. Specifically, the driver 231 is operable, based on timing signals received from the timing controller 22, to provide or not to provide drive currents with a constant magnitude respectively to the power lines 221. The first gate signal controller 241 and the second gate signal controller 251 cooperatively turn on and turn off the first transistor switches (T1) and the second transistor switches (T2) of the daughterboards 30 in such a way that the LEDs (L) of the daughterboards 30 emit light row by row (sequentially without overlapping in time). That is, the first gate signal controller 241 turns on the first transistor switches (T1) of the daughterboard 30 that is to emit light, and turns off the first transistor switches (T1) of the daughterboard(s) 30 that is(are) not to emit light, and the second gate signal controller 251 turns off the second transistor switches (T2) of the daughterboard 30 that is to emit light, and turns on the second transistor switches (T2) of the daughterboard(s) 30 that is(are) not to emit light, so the LEDs (L) of the daughterboard 30 that is to emit light respectively receives the drive currents. In a scenario where a frame rate of the LED display device is 60 Hz and a total number of the rows is 180 (i.e., a scan time of the LED display device=1/(60×180) s=92.59 μs), each of the power lines 232 is electrically connected to one LED (L) instead of 180 LEDs (L) at a time, so parasitic capacitance effect can be reduced, thereby reducing power consumption of the LED display device and improving display quality of the LED display device.

It should be noted that, the implementation depicted in FIGS. 1 and 2 may be modified in a way that will be described below. In the modification of the implementation depicted in FIGS. 1 and 2, each of the first transistor switches (T1) and the second transistor switches (T2) of the daughterboards 30 is an N-type TFT. With respect to each of the LED units 32 of the daughterboards 30, the anode of the LED (L) is connected to the source terminal of the first transistor switch (T1) and the drain terminal of the second transistor switch (T2). With respect to each of the columns, the drain terminals of the first transistor switches (T1) that respectively connected the LEDs (L) in the column are connected to the power line 232 that corresponds to the column. With respect to each of the daughterboards 30, the cathodes of the LEDs (L) and the source terminals of the second transistor switches (T2) are connected to the ground circuit 26.

Figure 3:
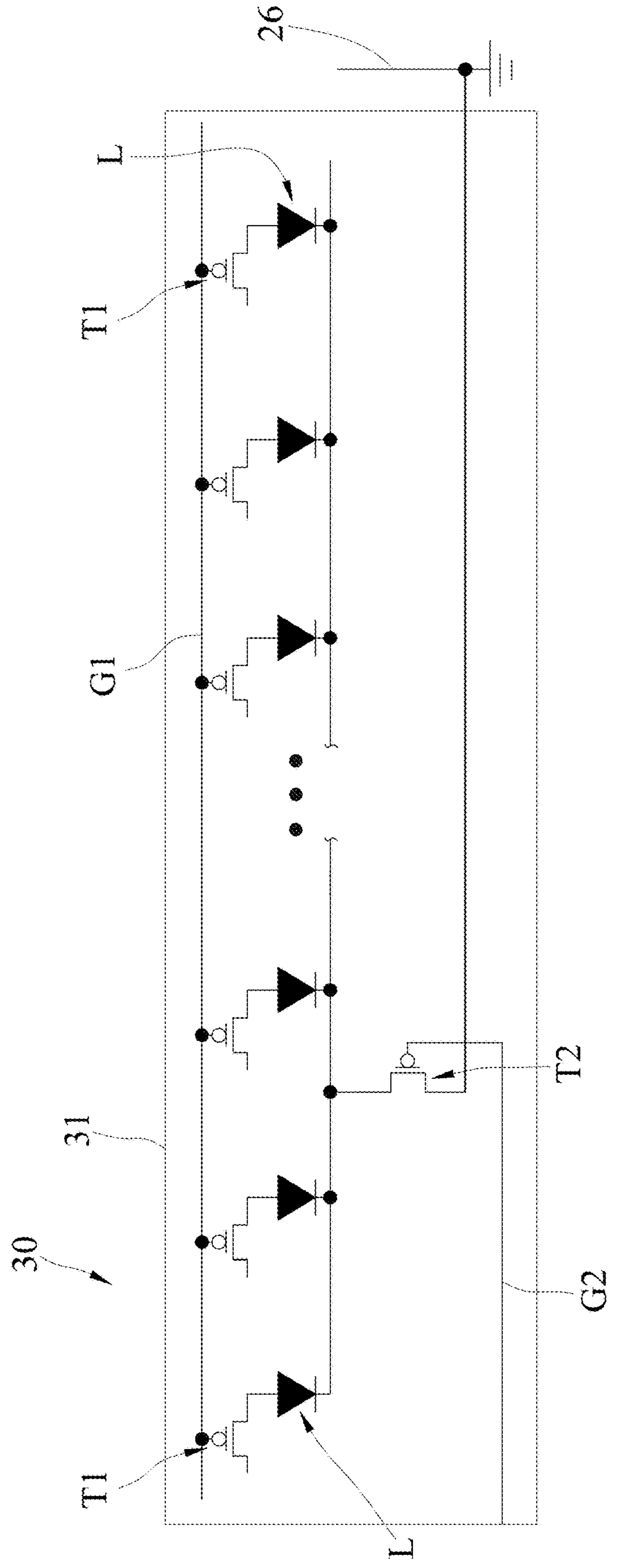
FIG. 3 is a schematic view illustrating a second embodiment of the LED display device according to the disclosure.

Referring to FIG. 3, a second embodiment of the LED display device according to the disclosure is similar to the first embodiment, but differs from the first embodiment in the structure of the daughterboards 30.

In the second embodiment, each of the daughterboards 30 includes a plurality of LEDs (L), a plurality of first transistor switches (T1) and a second transistor switch (T2), where the LEDs (L) are connected to the first transistor switches (T1) and the second transistor switch (T2). FIG. 3 depicts an implementation where each of the first transistor switches (T1) and the second transistor switches (T2) of the daughterboards 30 is a P-type transistor. With respect to each of the daughterboards 30, anodes of the LEDs (L) are respectively connected to drain terminals of the first transistor switches (T1); gate terminals of the first transistor switches (T1) is connected to the first gate line (G1) that corresponds to the daughterboard 30; cathodes of the LEDs (L) are connected to each other, and are further connected to a source terminal of the second transistor switch (T2); a drain terminal of the second transistor switch (T2) is connected to the ground circuit 26; and a gate terminal of the second transistor switch (T2) is connected to the second gate line (G2) that corresponds to the daughterboard 30, so as to receive a timing signal. Even when each of the daughterboards 30 includes only one second transistor switch (T2), parasitic capacitance effect can be reduced, thereby reducing power consumption of the LED display device and improving the display quality of the display device.

Referring to FIGS. 1 to 3, in view of the above, in each of the aforesaid embodiments, since the first transistor switches (T1) of each of the daughterboards 30 are respectively connected between the power lines 232 and the LEDs (L) of the daughterboard 30, each of the power lines 232 is electrically connected to one LED (L) at a time during the time multiplexed scan, so parasitic capacitance effect can be reduced, thereby reducing power consumption of the LED display device and improving the display quality of the LED display device. In addition, since the LED display device is obtained by assembling a plurality of daughterboards 30, on which a plurality of LEDs (L) are disposed, to the board body 21, the number of LED transfers can be reduced to achieve time efficiency, and deformation and warping of the board body 21 due to uneven stress endured thereby during the mass transfer of LEDs can be prevented to facilitate application of the LED display device.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A light emitting display device comprising:

a system board including a drive power circuit, a first gate circuit and a second gate circuit; and a plurality of daughterboards assembled on said system board, each of said daughterboards including a substrate, a plurality of LEDs that are disposed on said substrate, a plurality of first transistor switches that are respectively connected to said LEDs, and at least one second transistor switch that is connected to said LEDs;

wherein, with respect to each of said daughterboards, said first transistor switches and said at least one second transistor switch cooperatively control current flows through said LEDs, said first transistor switches are further connected to said drive power circuit to respectively receive a plurality of drive currents, and are further connected to said first gate circuit to receive a timing signal, and said at least one second transistor switch is further connected to said second gate circuit to receive a timing signal;

wherein said drive power circuit includes a plurality of power lines;

wherein said first gate circuit includes a plurality of first gate lines that respectively correspond to said daughterboards;

wherein said second gate circuit includes a plurality of second gate lines that respectively correspond to said daughterboards;

wherein said LEDs of said daughterboards are arranged in a matrix that has a plurality of rows and a plurality of columns respectively corresponding to said power lines;

wherein, with respect to each of said daughterboards, gate terminals of said first transistor switches are connected to said first gate line that corresponds to said daughterboard, and gate terminal(s) of said at least one second transistor switch is(are) connected to said second gate line that corresponds to said daughterboard; and wherein, with respect to each of said columns, said first transistor switches that are respectively connected to said LEDs in said column are further connected to said power line that corresponds to said column.

2. The LED display device as claimed in claim 1, wherein:

said system board further includes a board body and a ground circuit; and said drive power circuit, said first gate circuit, said second gate circuit and said ground circuit are disposed on said board body.

3. The LED display device as claimed in claim 2, wherein:

said substrate of each of said daughterboards is selected from a glass substrate, a silicon substrate and a circuit board; and said board body is selected from a glass substrate, a silicon substrate and a circuit board.

4. The LED display device as claimed in claim 2, wherein, with respect to each of said daughterboards:

source terminals of said first transistor switches are connected to said drive power circuit; and drain terminals of said first transistor switches are respectively connected to anodes of said LEDs.

5. The LED display device as claimed in claim 4, wherein:

each of said daughterboards includes a plurality of said second transistor switches; and with respect to each of said daughterboards, source terminals of said second transistor switches are respectively connected to said anodes of said LEDs, and drain terminals of said second transistor switches are respectively connected to cathodes of said LEDs, and are further connected to said ground circuit.

6. The LED display device as claimed in claim 4, wherein:

each of said daughterboards includes one of said second transistor switch; and with respect to each of said daughterboards, a source terminal of said second transistor switch is connected to cathodes of said LEDs, and a drain terminal of said second transistor switch is connected to said ground circuit.

7. The LED display device as claimed in claim 1, wherein:

said system board further includes a ground circuit; and said second transistor switches of said daughterboards are connected to each other, and are further connected to said ground circuit.

8. The LED display device as claimed in claim 1, wherein said drive power circuit further includes a driver that is connected to said power lines and that is configured to provide and control the drive currents respectively to said power lines.

9. The LED display device as claimed in claim 1, wherein said LEDs of each of said daughterboards are connected to each other in one of a common cathode configuration and a common anode configuration.

10. The LED display device as claimed in claim 1, wherein said system board further includes a timing controller that is connected to said drive power circuit, said first gate circuit and said second gate circuit.

11. The LED display device as claimed in claim 1, wherein each of said LEDs of said daughterboards is a packaged die.

* * * * *